Patented Dec. 9, 1941

2,265,563

UNITED STATES PATENT OFFICE 2,265,563

LAMINATED CELLULOSE PRODUCTS

Arnold Kirkpatrick, Webster Groves, Mo., assignor to Monsanto Chemical Company, St. Louis, Mo., a corporation of Delaware No Drawing. Application June 2, 1937, Serial No. 146,113

13 Claims. (Cl. 106—40)

This invention relates to molded products and has especial reference to new methods for imparting desirable characteristics to molded products made from cellulose and lignin resins.

The principal object of this invention is the provision of a method for the production of molded products whereby the finished product will have desirable properties such as a high gloss, a jet black color and which will be perfectly bonded so as to present a strong resistance to attack by water penetration and otherwise, yet which may be processed without adhering to the equipment such as the press plates.

A typical molding material of the class to which this invention is applicable is that made by exploding wood with steam thereby obtaining a product which is partly cellulose and partly a lignin resin. The procedure is known in the art and forms no part of the present invention. The material is usually formed into sheets resembling rather thin cardboard, light brown in color and somewhat brittle several of which are superimposed and pressed together in a hot platen press. The product obtained is somewhat similar to "Bakelite" and may be used for the same purposes. However, the color of the finished product is not as attractive as "Bakelite" products, it does not have a sufficiently high gloss, the sheets or other units are not invariably bonded together sufficiently well and trouble is experienced with the product sticking to the press plates.

According to this invention materials which impart the desired properties are added in relatively small proportions to the molding material prior to the bonding by pressure. It has been found that small proportions of an aromatic carboxylic acid or anhydride, for example, phthalic, benzoic and salicyclic, serve to impart a high gloss to the finished product. To obtain a jet black color in the finished product a relatively small quantity of a phenolic ester, as, for example, diphenyl phthalate, tricresyl phosphate, etc. is added prior to the bonding. The usual plasticizers may be employed to improve the bonding together of the sheets, but it has been found that acetanilid and the phenolic esters of aromatic sulfonic acids (e. g. cresol toluene sulfonate) are especially valuable for this purpose and yield results far superior to those obtained with other plasticizers. To overcome the difficulty experienced from the adhesion of the material to the press plates a small quantity of a halogenated di- or triphenyl, a halogenated diphenyl oxide or halogenated triphenyl oxide or a chlorinated naphthalene is added.

In practicing the present invention it will be found that the various ingredients may be incorporated into the molding material at one time, so that gloss, color, bonding and freedom from adhesion may all be obtained by one operation and that this may be done without one agent deleteriously affecting the action of the others upon the molded product. In fact, by the judicious selection of materials one will enhance the action of the other. For example, the material which prevents adhesion may also darken the color and improve the bonding of the molding material and the substance which gives the jet black color may also improve the bond. However, one or more may be used if only certain of these properties are desired in the finished product and other properties are not required to the full extent made possible by the present invention.

The proportion of each ingredient to be used is subject to considerable variation depending on the molding material to be treated and the properties desired. However, for most purposes it is preferable to treat the molding material in the form of sheets and to incorporate the mixed ingredients in an amount equal to not over five per cent of the weight of the cellulose-lignin product. By way of illustration, such a mixture of ingredients may comprise equal parts by weight of tricresyl phosphate, phthalic anhydride and a chlorinated diphenyl marketed under the name "Aroclor 2565." A convenient method of applying the mixture is to dissolve it in a suitable volatile solvent, for example benzene or alcohol, and spray the solution on the sheets of material to be molded. The sheets are then dried, superimposed in a platen press and pressed for from five to ten minutes at approximately 180° C. and at a pressure of from one thousand to three thousand pounds per square inch. The product is jet black, has a high gloss, the sheets are bonded together in a superior manner, and it does not adhere to the press plates.

It is not necessary to treat all of the sheets to be bonded. From one to four sheets on each side of a twenty-five sheet pile may be more heavily treated with the mixture and a product having all the desirable qualities is obtained. This has the advantage of permitting the concentration of the treating mixture on the surface, where it is most desired while permitting a reduction in the amount necessary for treating a given quantity of the molding material. Of course where the mixture is applied to all the sheets, a much smaller quantity is applied to each sheet.

The products prepared by this process are jet black in color, have a high gloss, the component parts are bonded in a superior manner, and no trouble is experienced from adhesion of the material to the press plates.

The molding material need not be formed into sheets but may be run through a carding roll, the materials of this invention applied, and then molded in any type of mold. Instead of sheets, the lignin-cellulose molding material may be used in shredded form. The temperature and pressure as well as the time of molding may be varied widely, depending on the material to be molded and the properties desired in the product.

What I claim is:

1. In combination, a phenolic ester; a substance selected from the group consisting of aromatic carboxylic acids and aromatic carboxylic acid anhydrides; a substance selected from the group consisting of halogenated diphenyls, halogenated triphenyls, halogenated diphenyl oxides, halogenated triphenyl oxides and chlorinated naphthalenes; and a plasticizer.

2. In combination, cellulose fibres; a lignin resin; a phenolic ester; a substance selected from the group consisting of aromatic carboxylic acids and aromatic carboxylic acid anhydrides; a substance selected from the group consisting of halogenated diphenyls, halogenated triphenyls, halogenated diphenyl oxides, halogenated triphenyl oxides and chlorinated naphthalenes; and a plasticizer.

3. A molded product comprising a cellulose fibre-lignin resin base to which there has been added a phenolic ester; a substance selected from the group consisting of aromatic carboxylic acids and aromatic carboxylic acid anhydrides; a substance selected from the group consisting of halogenated diphenyls, halogenated triphenyls, halogenated diphenyl oxides, halogenated triphenyl oxides and chlorinated naphthalenes; and a plasticizer.

4. A composition of matter comprising a molding material, said molding material containing a lignin resin and being admixed with a phenolic ester of an aromatic sulfonic acid as a plasticizer therefor.

5. A composition of matter comprising a molding material, said molding material containing a lignin resin and being admixed with a phenolic ester, said phenolic ester imparting a jet black color to the molding material upon molding.

6. A composition of matter comprising a molding material, said molding material containing a lignin resin and being admixed with a substance selected from the group consisting of halogenated diphenyls, halogenated triphenyls, halogenated diphenyl oxides, halogenated triphenyl oxides and chlorinated naphthalenes, said molding material being substantially free of adhesive properties, even under molding conditions.

7. In combination, a moldable cellulose fiber-lignin resin base to which there has been added a phenolic ester, a substance selected from the group consisting of aromatic carboxylic acids and aromatic carboxylic acid anhydrides, a substance selected from the group consisting of halogenated diphenyls, halogenated triphenyls, halogenated diphenyl oxides, halogenated triphenyl oxides and chlorinated naphthalenes, and a plasticizer.

8. A composition of matter comprising a cellulosic molding material, said molding material containing a lignin resin and being admixed with a phenolic ester of an aromatic sulfonic acid as a plasticizer therefor.

9. A composition of matter comprising a cellulosic molding material, said molding material containing a lignin resin and being admixed with a phenolic ester, said phenolic ester imparting a jet black color to the molding material.

10. A composition of matter comprising a cellulosic molding material, said molding material containing a lignin resin and being admixed with a substance selected from the group consisting of halogenated diphenyls, halogenated triphenyls, halogenated diphenyl oxides, halogenated triphenyl oxides and chlorinated naphthalenes, said molding material being substantially free of adhesive properties, even under molding conditions.

11. A composition of matter comprising a molding material containing a thermoplastic lignin resin admixed with a substance selected from the group consisting of aromatic carboxylic acids and aromatic carboxylic acid anhydrides, said substance imparting a glossy finish to the material upon molding.

12. A composition of matter comprising a cellulosic molding material containing a thermoplastic lignin resin admixed with a substance selected from the group consisting of aromatic carboxylic acids and aromatic carboxylic acid anhydrides, said substance imparting a glossy finish to the material upon molding.

13. A composition of matter comprising a cellulosic molding material containing a lignin resin prepared from wood which has been exploded with steam admixed with a substance selected from the group consisting of aromatic carboxylic acids and aromatic carboxylic acid anhydrides, said substance imparting a glossy finish to the material upon molding.

ARNOLD KIRKPATRICK.